(12) United States Patent
Toon

(10) Patent No.: US 6,328,887 B1
(45) Date of Patent: Dec. 11, 2001

(54) TOW WOUND FILTER CARTRIDGE

(75) Inventor: John Joseph Toon, Edgewater, FL (US)

(73) Assignee: N. V. Bekaert S.A., Zwevegem (BE)

( * ) Notice: Subject to any disclaimer, the term of this patent is extended or adjusted under 35 U.S.C. 154(b) by 0 days.

(21) Appl. No.: 09/487,782

(22) Filed: Jan. 20, 2000

Related U.S. Application Data

(60) Provisional application No. 60/118,400, filed on Feb. 2, 1999.

(51) Int. Cl.$^7$ ............................ B01D 35/06; B01D 29/21; B01D 39/20
(52) U.S. Cl. ........................... 210/223; 210/457; 210/484; 210/494.1; 210/494.2; 210/497.01; 210/497.1
(58) Field of Search ..................................... 210/223, 222, 210/457, 483, 484, 494.1, 494.2, 497.1, 497.01

(56) References Cited

U.S. PATENT DOCUMENTS

| | | | |
|---|---|---|---|
| 3,065,856 | 11/1962 | Goldman . | |
| 3,379,000 | 4/1968 | Webber et al. | 57/243 |
| 3,828,934 | * 8/1974 | Green et al. | 210/457 |
| 3,977,070 | * 8/1976 | Schildbach | 29/423 |
| 4,048,075 | * 9/1977 | Colvin et al. | 210/484 |
| 4,269,707 | 5/1981 | Butterworth et al. . | |
| 4,930,199 | 6/1990 | Yanagisawa | 29/4.51 |
| 5,679,251 | 10/1997 | Swanson et al. | 210/497.01 |

FOREIGN PATENT DOCUMENTS

| | | |
|---|---|---|
| 36 02 153 | 7/1987 | (DE) . |
| 0 493 049 | 7/1992 | (EP) . |
| 0 810 020 | 3/1997 | (EP) . |
| 00/45937 | 8/2000 | (WO) . |

OTHER PUBLICATIONS

International Search Report dated May 3, 2000 that is from a counterpart International Application No. PCT/EP00/00345, filed Jan. 13, 2000, and published as International Publication No. WO 00/45937, published Aug. 10, 2000.
Patent Abstracts of Japan; vol. 005, No. 071 (C–054), May 13, 1981 & JP 21618 (1 page).
English language Abstract/Data Sheet of EP 0 810 020, printed out Jun. 21, 2001, 2 pp.

* cited by examiner

*Primary Examiner*—David A. Reifsnyder
(74) *Attorney, Agent, or Firm*—Shlesinger, Arkwright & Garvey LLP

(57) ABSTRACT

A tow wound filter cartridge comprises a permeable core and one or more tows wound in a helicoidally or diamond-like shaped way or serpentine-like way around the core, having a zero twist degree, in order to obtain a filter rating of below 75 micrometer. The tows may comprise metal fibers. Preferably the tows of the filter cartridge consist only of metal fibers.

20 Claims, 3 Drawing Sheets

TOW WOUND FILTER CARTRIDGE

CROSS REFERENCE TO RELATED APPLICATIONS

This application claims the benefit of U.S. Provisional Application No. 60/118,400, filed Feb. 2, 1999, which is incorporated herein by reference.

This application likewise claims the benefit of International Application No. PCT/EP00/00345, filed Jan. 13, 2000, which Application No. PCT/EP00/00345 claims the benefit of U.S. Provisional Application No. 60/118,400, filed Feb. 2, 1999.

FIELD OF THE INVENTION

The present invention relates to a tow wound filter cartridge comprising a permeable core and one or more tows wound in a helicoidally or diamond-like shaped way or serpentine-like way around the core.

BACKGROUND OF THE INVENTION

Tow wound filter cartridges are known as such in the art.

As a matter of example, U.S. Pat. No. 5,679,251 discloses a tow wound filter cartridge, which comprises polyester yarns. The filter is used as a secondary oil filter in diesel engines.

Next to their filter rating, these types of filter cartridges, however, suffer from some major disadvantages.

One of the main disadvantages is that such a filter cartridge is not fit to be cleaned or back-flushed several times. These filter cartridges are used and simply discarded after their use.

Another disadvantage is that such a filter cartridge is not fit to operate in severe circumstances such as under high pressures or under high temperatures. Indeed textile filter cartridges are not stable. Textile filter cartridges swell as they become wet and the outside wraps or layers slides down the outside surfaces.

SUMMARY OF THE INVENTION

It is an object of the present invention to provide a filter cartridge with an improved filter rating compared to the tow wound filters as known in the art.

It is another object of the present invention to provide a filter cartridge, which can be cleaned several times.

It is also an object of the present invention to provide a non-disposable filter cartridge.

It is yet another object of the present invention to provide a filter cartridge with an improved integrity and stability of the filter medium.

According to the invention, there is provided a tow wound filter cartridge comprising a permeable core and one or more tows wound in a helicoidally or diamond-like shaped way or serpentine-like way around the core in order to obtain an absolute filter rating of below 75 micrometer. The tows may comprise metal fibers and, in a preferred embodiment of the invention, the tows consist of only metal fibers. It is even so that tow wound filters as subject of the invention can be provided, retaining more than 95%, e.g. more than 99% of all particles larger than 20 $\mu$m, even of all particle larger than 10 $\mu$m or 5 $\mu$m. Tow wound filters as subject of the invention may retain more than 95% of all particles larger than 1 $\mu$m or 0.75 $\mu$m.

One tow or bundle may comprise between 100 and 15000 fibers, for example 10000 or 12000 fibers. The filter may comprise more than one tow where each tow has a different number of fibers or where each tow has a different type of fibers, e.g. with fibers of a different diameter. Tows in a cartridge as subject of the invention have a zero twist degree, which means that the individual fibers in a tow run about parallel and untwisted one adjacent to the other. The result of this zero twist degree is that during the winding operation the tow is applied to the core in the form of a flat tape rather than an oval shaped yarn. This results in lower void volume in the filter, which in turn leaves less space for small particles to pass through. So the zero twist degree allows obtaining lower filter ratings in comparison with wound tow cartridge filters with tows having a twist.

The tows of the filter cartridge may form a plurality of layers around the core of the cartridge. Each of the layers may consist only of fibers of an equal fiber diameter and the diameter of the fibers may vary depending upon the layer in which the tow is positioned.

In this way asymmetric filter structures may be formed by winding different fiber diameters in layers onto the core in an ascending or descending fiber diameter order.

Within the context of the present invention, the terms "metal fibers" refer to fibers which can be manufactured by abrading the upper edge of a rolled metal foil, as described in U.S. Pat. No. 4,930,199, or by using the bundled drawing technique, as described, e.g., in the patent U.S. Pat. No. 3,379,000, or by means of a melt extraction technique. The metal fibers have an equivalent diameter ranging between 1 $\mu$m and 100 $\mu$m, preferably ranging between 1.5 $\mu$m and 45 $\mu$m, for example between 2 $\mu$m and 30 $\mu$m. The terms "equivalent diameter of a fiber" are defined as the diameter of an imaginary round fiber having the same cross-section as that of the real fiber concerned.

In a preferred embodiment of the present invention, a filter cartridge comprise or even consists of metal fibers, most preferably stainless steel fibers, e.g. of alloy AISI 302, AISI 304, AISI316 or AISI316L.

The metal fibers may have a composition, which is resistant to high temperatures and to thermal shocks. For this purpose, they may comprise minimum amounts of Al (aluminum) and Cr (chrome). Examples of such a composition are $Fe_aCr_bAl_cY_d$. alloys such as disclosed in EP 0 157 432.

In a particular embodiment of the present invention, the magnetic properties of the metal fibers in the tows of the filter cartridge are used. Bundled-drawn stainless steel fibers are ferromagnetic, i.e. when applied in an external magnetic field, they have a relative magnetic permeability $\mu_r$ which is a number of times greater than one. Ferromagnetic materials e.g. comprise components chosen among Fe, Co, Co, Cu, Ni, . . . Usually the higher the Fe, Co, Cu or Ni contents, the more pronounced the ferromagnetic properties. A tow wound filter cartridge with ferromagnetic fibers has the advantage of being more effective in removing magnetic and para-magnetic particles from, for example, lubricating oils. Indeed it is important that engine oil filters for internal combustion engines can remove the small iron particles which are produced by the wear cycles. By placing tow wound cartridges of this type in a magnetic field, the iron particles can be filtered out of the engine oil more effectively. This is an additional advantage of some of the inventive tow wound filter cartridges in comparison with textile filters or paper filters.

In still another embodiment of the present invention the tow wound filter cartridge comprising metal fibers has been sintered, e.g. hydrogen-sintered in order to avoid fiber transfer. So the integrity of the filter medium has been increased by the sintering operation. Such a sintered version is more adapted to be used in more demanding applications such as highly loaded liquids or gases, high turbulencies and filter cartridges operating under high vibrations. The sintering operation, however, removes the ferromagnetic properties of the fibers, i.e. the relative magnetic permeability $\mu_r$ becomes one after the sintering operation.

Tow wound filters as subject of the invention, comprising mainly metal fibers are more stable, since they don't swell significantly under use, and are more resistant to higher temperatures, pressure and aggressive circumstances. It is even so that, after being cleaned several times by applying a black-flush, tow wound filters comprising mainly metal fibers maintain their filter performance to a large extend, so providing a non-disposable filter madium.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
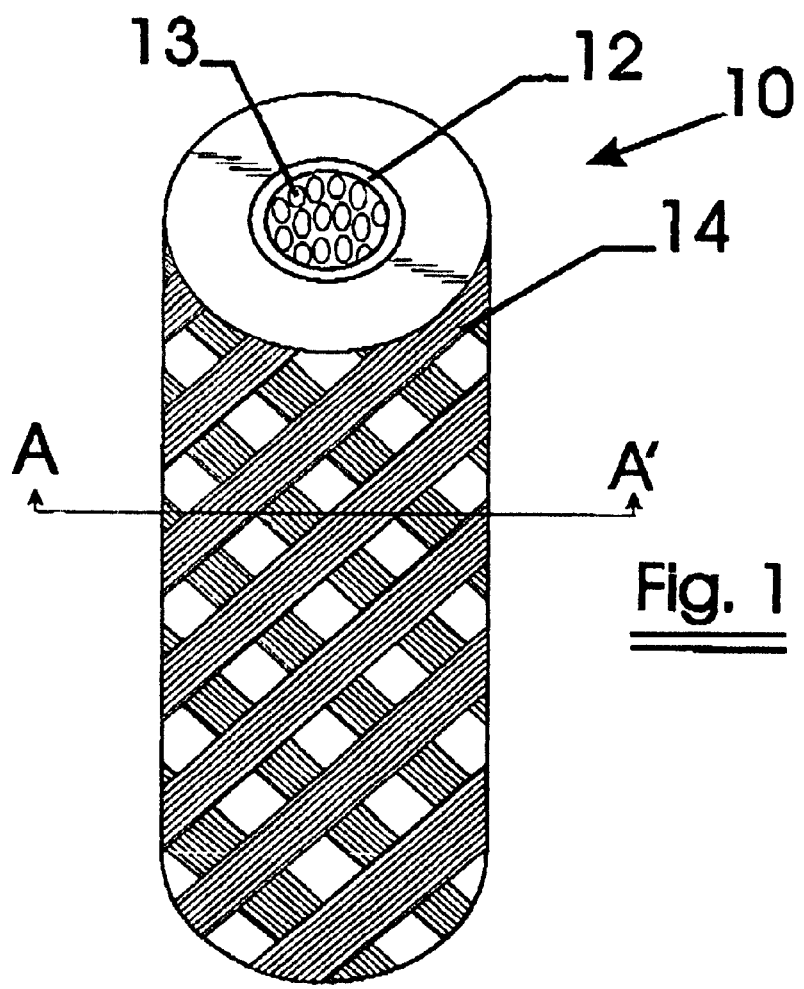
FIG. 1 shows a side view of a tow wound filter cartridge according to the invention .
Figure 5:
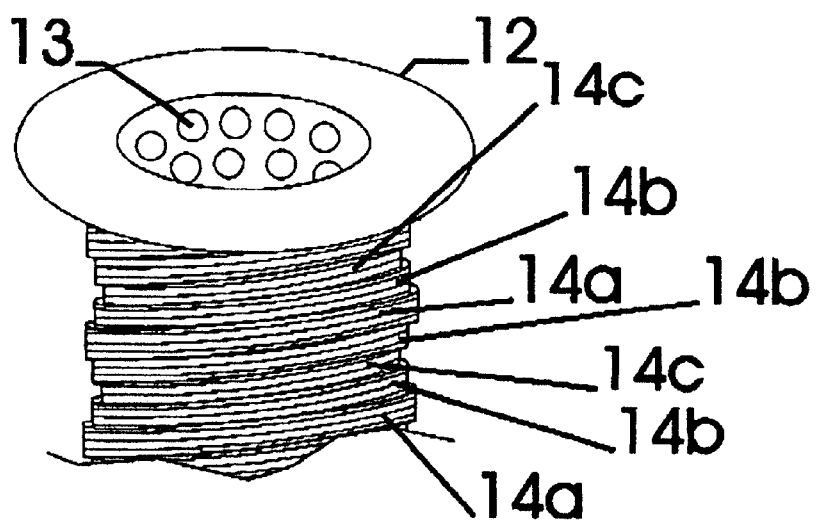
FIG. 5 shows a side view of a helicoidally wound tow wound filter cartridge.
Figure 6:
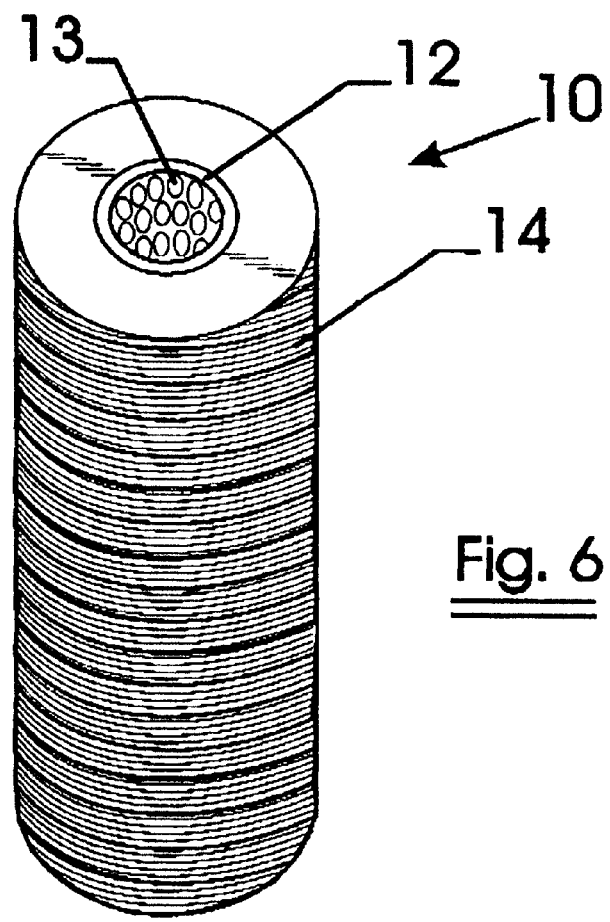
FIG. 6 shows a side view of a serpentine-like wound tow wound filter cartridge.

FIG. 1 schematically shows a tow wound filter cartridge 10 comprising a permeable core 12 in the form of a metal cylinder with holes 13 provided in its surface. Tows 14 of fibers 16, preferably metal fibers, have been wound in a helical (as shown in FIG. 5) or diamond-like shaped way (as shown in FIG. 1) or serpentine-like (as shown in FIG. 6) way around the core. The particular way of winding together with the number of fibers in a tow and the diameter of the fibers determines the filter rating of a filter cartridge. Several layers of windings may be put one above the other.

As can be seen in FIG. 5, several tows 14a, 14b, and 14c, can be wound around the core 12 following a helicoidal line, so being helicoidally wound.

As can be seen in FIG. 6, a tow 14 can be wound around a core 12 in such a way that the edges of the tow touch lightly, for example, sidewise, so being serpentine-like wound.

Figure 2:
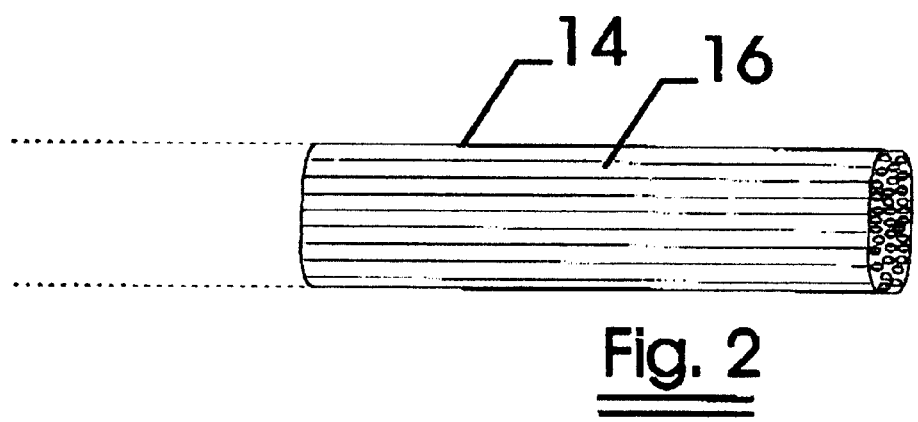
FIG. 2 shows a zero twist tow.

FIG. 2 illustrates a zero twist tow 14 with metal fibers 16. The term zero twist means that the metal fibers 16 are not twisted around each other and are arranged in more or less a parallel way.

Figure 3:
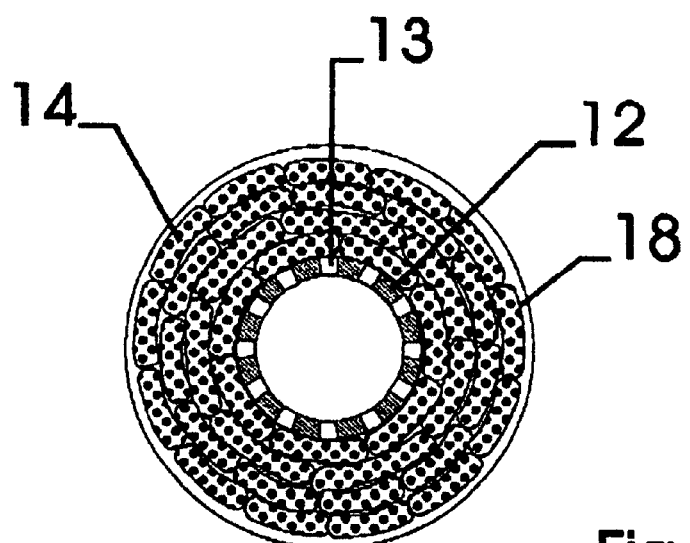
FIG. 3 shows a radial section of a tow wound filter as subject of the invention.
Figure 4:
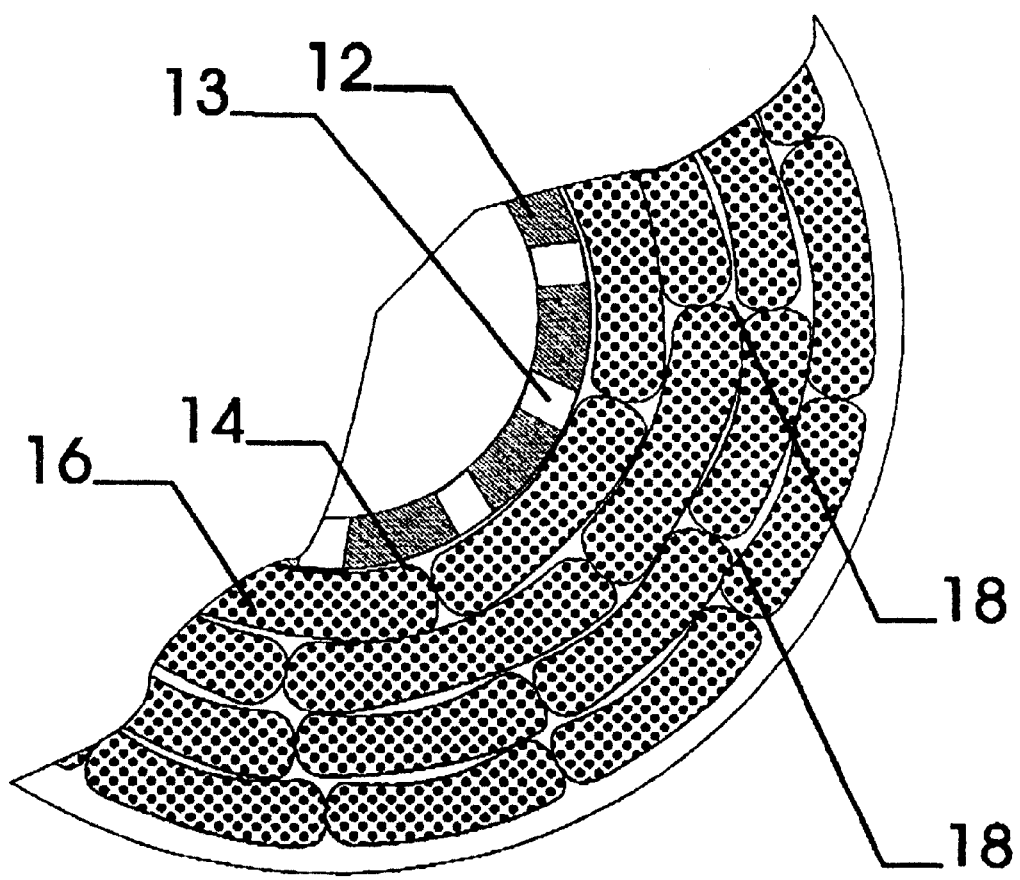
FIG. 4 shows a detail of the section as shown in FIG. 3.

FIG. 3 is a radial cut of a tow wound filter as shown in FIG. 1, parallel to the plane AA'. FIG. 4 is a detail view of FIG. 3. As shown in FIG. 4, the filter has the advantage that the tow itself may easily take the form of a flat, rectangular or square ribbon and that upon winding such a tow around the core 12, volume voids 18 are avoided as much as possible so that the filter rating is decreased in comparison with filter cartridges where the tows have no zero twist.

In contrast herewith tows with a non zero twist do not take the form of a flat, rectangular or square ribbon, and remain rather circular or oval in shape. Winding such tows with a non-zero twist always creates voids between adjacent windings.

Several embodiments of the tow wound filter cartridge according to the invention were manufactured for test purposes.

Aqueous suspensions of AC Spark Plug Fine Air Cleaner test dust were prepared.

The filters were first flushed with ten gallons of deionized water, followed by one gallon of dust suspension. After approximately three quarts of effluent had been collected, a 1 ml (milli-liter=1/1000 liter) sample was passed through a 0.45 micrometer (34 mm diameter) Millipore filter. Following filtration, the filters were dried and examined using an Olympus CH-2 Microscopic, equipped to perform light, phase, contrast, dark field, and polarized light microscopy. Examination was performed at 1000X.

Ten fields per filter were counted.

Particles were sized, using the Olympus Reticule (graduated from 0 micrometer to 100 micrometer), and percentages calculated as well as total number of particles per filter (10 ml of sample).

Table I summarizes the results.

Other test samples were subjected to similar tests, aiming at even lower filter ratings. The tests were done under ambient temperature using water and ISO A2 (fine) contamination. As can be found in table II, a retention of more than 95% of the particles larger than 1 $\mu$m or even of particles larger than 0.75 $\mu$m can be obtained using zero twist tow wound filters.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

TABLE I

|  | Filter #1<br>Filter rating 50 $\mu$m | Filter #2<br>Filter rating 25 $\mu$m | Filter #3<br>Filter rating 10 $\mu$m |
| --- | --- | --- | --- |
| Internal diameter | 1.07 | 1.07 | 1.07 |
| (inch) | (27.178 mm) | (27.178 mm) | (27.178 mm) |
| Outer diameter | 1.96 | 2.10 | 1.74 |
| (inch) | (49.784 mm) | (53.34 mm) | (44.196 mm) |

TABLE I-continued

|  |  | Filter #1<br>Filter rating 50 μm | | Filter #2<br>Filter rating 25 μm | | Filter #3<br>Filter rating 10 μm | |
|---|---|---|---|---|---|---|---|
| Weight (Ozs) | | 16.7<br>(473.445 g) | | 24.2<br>(686.07 g) | | 15.3<br>(433.755 g) | |
| | Filter charge | | | | | | |
| Particle size range (μm) | % | Particles per ml | Particles per ml | % reduction | Particles per ml | % reduction | Particles per ml | % reduction |
| <1 | 49.6 | 1134400 | 345420 | 69.6 | 49980 | 95.6 | 61202 | 94.6 |
| 1–5 | 18.3 | 417600 | 200640 | 51.9 | 31752 | 92.4 | 9798 | 97.7 |
| 5–10 | 10.4 | 238400 | 19380 | 91.9 | 2268 | 99.0 | 0 | 100 |
| 10–20 | 8.6 | 196000 | 4560 | 97.7 | 0 | 100 | 0 | 100 |
| 20–50 | 10.6 | 243000 | 0 | 100 | 0 | 100 | 0 | 100 |
| >50 | 2.5 | 56600 | 0 | 100 | 0 | 100 | 0 | 100 |
| Total particles | | 2286000 | 579000 | | 84000 | | 71000 | |
| % reduction (all sizes) | | | | 75.1 | | 96.3 | | 96.9 |

TABLE II

| | | Particle size | | | | | | | |
|---|---|---|---|---|---|---|---|---|---|
| sample | Number particles | 1–2 (μm) | 2–5 (μm) | 3–4 (μm) | 4–5 (μm) | 5–7 (μm) | 7–10 (μm) | 10–12 (μm) | >12 (μm) |
| Filter rating 10 μm; 11 μm fibers | Upstream | 96779 | 34176 | 33581 | 16080 | 8554 | 3963 | 729 | 829 |
| | Downstream | 14725 | 3557 | 2261 | 569 | 113 | 7 | 1 | 1 |
| | Retention (%) | 84.78 | 89.59 | 93.40 | 96.46 | 98.68 | 99.83 | 99.86 | 99.88 |
| Filter rating 10 μm; 8 μm fibers | Upstream | 96656 | 33878 | 33701 | 1621 | 8809 | 4106 | 744 | 816 |
| | Downstream | 1461 | 205 | 91 | 23 | 4 | 1 | 0 | 0 |
| | Retention (%) | 98.49 | 99.39 | 99.73 | 98.60 | 99.95 | 99.98 | >99 | >99 |
| | | 0.5–0.6 (μm) | 0.6–0.75 (μm) | 0.75–1 (μm) | 1–2 (μm) | 2–3 (μm) | 3–4 (μm) | 4–5 (μm) | >5 (μm) |
| Filter rating 10 μm; 8 μm fibers | Upstream | 62005 | 82350 | 87681 | 49795 | 10347 | 6059 | 3177 | 3963 |
| | Downstream | 9323 | 6499 | 3659 | 1029 | 53 | 13 | 5 | 2 |
| | Retention (%) | 84.96 | 92.11 | 95.83 | 97.93 | 99.49 | 99.79 | 99.85 | 99.95 |

I claim:

1. A tow wound filter cartridge comprising a permeable core and one or more tows wound in a helicoidally or diamond shaped way around said core, said tows having a zero twist degree, the zero twist degree resulting in a low void volume leaving less space for small particles to pass through.

2. A filter cartridge according to claim 1 wherein said tows comprise metal fibers.

3. A filter cartridge according to claim 2 wherein said metal fibers are ferromagnetic fibers.

4. A filter cartridge according to claim 2, wherein:
a) said tows form a plurality of layers.

5. A filter cartridge according to claim 1 wherein said tows consist of metal fibers.

6. A filter cartridge according to claim 3 wherein said cartridge has been sintered in order to avoid fiber transfer.

7. A filter cartridge according to claim 1, wherein said tow wound filter cartridge has an absolute filter rating of below 75 micrometer.

8. A filter cartridge according to claim 7, wherein:
a) said metal fibers are ferromagnetic fibers.

9. A filter cartridge according to claim 7, wherein:
a) said cartridge has been sintered in order to avoid fiber transfer.

10. A filter cartridge according to claim 1, wherein said tow wound filter cartridge retains 95% of all particles larger than 1 μm.

11. A filter cartridge according to claim 1 wherein said fibers have a diameter ranging from 1 micrometer to 100 micrometer.

12. A filter cartridge according to claim 1 wherein said tows form a plurality of layers.

13. A filter cartridge according to claim 12 wherein each of said layers only consists of tows with fibers of an equal fiber diameter.

14. A filter cartridge according to claim 13 wherein a first of said layers consists of tows with fibers of a first fiber diameter, wherein a second of said layers consists of tows with fibers of a second fiber diameter, said first fiber diameter being different from said second fiber diameter.

15. A filter cartridge according to claim 14 wherein said second fiber diameter is greater than said first fiber diameter and wherein said second of said layers is positioned closer to the core than said first of said layers.

16. A filter cartridge according to claim 14 wherein said second fiber diameter is greater than said first fiber diameter and wherein said first of said layers is positioned closer to the core than said second of said layers.

17. A tow wound filter cartridge, comprising:
 a) a permeable core; and
 b) a least one tow wound in a helicoidally shaped way around said core, said at least one tow having a zero twist degree, and the zero twist degree resulting in a low void volume leaving less space for small particles to pass through.

18. A filter cartridge according to claim 17, wherein:
 a) said at least one tow comprises metal fibers.

19. A tow wound filter cartridge comprising:
 a) a permeable core; and
 b) a least one tow wound in a diamond shaped way around said core, said at least one tow having a zero twist degree, and the zero twist degree resulting in a low void volume leaving less space for small particles to pass through.

20. A filter cartridge a according to claim 19, wherein:
 a ) said at least one tow comprises metal fibers.

* * * * *